(12) United States Patent
Kang et al.

(10) Patent No.: US 7,656,935 B2
(45) Date of Patent: Feb. 2, 2010

(54) INTERPOLATION OF CHANNEL SEARCH RESULTS

(75) Inventors: Inyup Kang, San Diego, CA (US);
Mark Roh, San Diego, CA (US);
Brendon L. Johnson, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 11/621,145

(22) Filed: Jan. 9, 2007

(65) Prior Publication Data
US 2007/0110130 A1 May 17, 2007

Related U.S. Application Data

(63) Continuation of application No. 10/000,928, filed on Oct. 23, 2001, now Pat. No. 7,200,162.

(60) Provisional application No. 60/316,488, filed on Aug. 31, 2001.

(51) Int. Cl.
*H04B 1/707* (2006.01)
(52) U.S. Cl. .................................... 375/147
(58) Field of Classification Search ............ 375/130, 375/140–142, 146, 147, 150, 316, 324, 322, 375/340

See application file for complete search history.

(56) References Cited

U.S. PATENT DOCUMENTS

| | | | | |
|---|---|---|---|---|
| 5,276,706 | A * | 1/1994 | Critchlow | 375/343 |
| 6,044,105 | A * | 3/2000 | Gronemeyer | 375/152 |
| 6,219,345 | B1 | 4/2001 | Clark et al. | |
| 7,099,421 | B2 | 8/2006 | Simmons et al. | |
| 2003/0021365 | A1 * | 1/2003 | Min et al. | 375/343 |

FOREIGN PATENT DOCUMENTS

| | | |
|---|---|---|
| EP | 0932263 | 7/1999 |
| EP | 1089452 A1 * | 4/2001 |
| JP | 11-008567 | 1/1999 |
| JP | 11-041141 | 2/1999 |

OTHER PUBLICATIONS

International Search Report- PCT/US02/27723-International Search Authority/EPO- Dec. 17, 2002 (2 pages).
International Preliminary Examination Report—PCT/US02/027723. IPEA—US, Jan. 29, 2004.

* cited by examiner

*Primary Examiner*—Kevin M Burd
(74) *Attorney, Agent, or Firm*—George C. Pappas; Jimmy Cheng

(57) ABSTRACT

In general, the invention facilitates searching for energy peaks in spread spectrum wireless communication systems with greater precision. More particularly, various embodiments of the invention may involve reporting not only an energy peak and its associated offset, but also the energy levels corresponding to one or more offsets occurring before and after the offset at which the energy peak occurs. Interpolation or extrapolation techniques may be used to predict the actual location of an energy peak based on the apparent location of the peak and the energy levels observed at surrounding offsets.

24 Claims, 4 Drawing Sheets

INTERPOLATION OF CHANNEL SEARCH RESULTS

RELATED APPLICATIONS

This application is a continuation of U.S. application Ser. No. 10/000,928, entitled "INTERPOLATION OF CHANNEL SEARCH RESULTS," filed Oct. 23, 2001 which claims the benefit of provisional U.S. Application Ser. No. 60/316,488, entitled "INTERPOLATION OF CHANNEL SEARCH RESULTS," filed Aug. 31, 2001, which is incorporated herein by reference in its entirety for all purposes.

FIELD

The invention relates to wireless communications and, more particularly, to wireless communications using spread spectrum techniques.

BACKGROUND

Wireless communication systems are widely deployed to provide various types of communication, such as voice and data communications. These systems may be based on a variety of modulation techniques, such as code division multiple access (CDMA) or time division multiple access (TDMA). A CDMA system provides certain advantages over other types of systems, including increased system capacity.

A CDMA system may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in a set of documents including "C.S0002-A Physical Layer Standard for cdma2000 Spread Spectrum Systems," the "C.S0005-A Upper Layer (Layer 3) Signaling Standard for cdma2000 Spread Spectrum Systems," and the "C.S0024 cdma2000 High Rate Packet Data Air Interface Specification" (the cdma2000 standard), and (4) some other standards.

Pseudorandom noise (PN) sequences are commonly used in CDMA systems for spreading transmitted data, including transmitted pilot signals. The time required to transmit a single value of the PN sequence is known as a chip, and the rate at which the chips vary is known as the chip rate. CDMA receivers commonly employ rake receivers. A rake receiver is typically made up of one or more searchers for locating direct and multipath pilots from one or more base stations, and two or more multipath demodulators (fingers) for receiving and combining information signals from those base stations.

Inherent in the design of direct sequence CDMA systems is the requirement that a receiver must align its PN sequences to those of a base station. For example, in IS-95, each base station and subscriber unit uses the exact same PN sequences. A base station distinguishes itself from other base stations by inserting a unique time offset in the generation of its PN sequences (all base stations are offset by an integer multiple of 64 chips). A subscriber unit communicates with a base station by assigning at least one finger to that base station. An assigned finger must insert the appropriate offset into its PN sequence in order to communicate with that base station. An IS-95 receiver uses one or more searchers to locate the offsets of pilot signals, and hence to use those offsets in assigning fingers for receiving. Since IS-95 systems use a single set of in-phase (I) and quadrature (Q) PN sequences, one method of pilot location is to simply search the entire PN space by correlating an internally generated PN sequence with different offset hypotheses until one or more pilot signals are located.

As the searcher correlates the PN sequence with each offset hypothesis, it records the resulting signal energy. Energy peaks appear for the offset hypotheses that result in recovery of the signal, while other offset hypotheses typically result in little or no signal energy. Multiple energy peaks may result from, for example, echoes produced when signals reflect from buildings and other objects.

In some cases, the reported peaks do not exactly coincide with the actual locations of the energy peaks. The signal propagation delay associated with the distance between a mobile unit and a base station may cause the location of an energy peak to exist at any fractional-chip offset. The searcher typically operates with a resolution of one-half of a PN chip. That is, the searcher tests offset hypotheses that are spaced out by one-half of a PN chip. As a result, the actual location of an energy peak may be at any offset within one-half of a chip from the location reported by the search hardware to the search software. Searching for energy peaks at half-chip intervals may not adequately detect the true location of an energy peak. However, doing so is beneficial to reduce search time, compared to searching at one-eighth chip resolution, for example.

Other systems, such as W-CDMA systems, differentiate base stations using a unique PN code for each, known as a primary scrambling code. The W-CDMA standard defines two Gold code sequences for scrambling the downlink, one for the in-phase component (I) and another for the quadrature (Q). The I and Q PN sequences together are broadcast throughout the cell without data modulation. This broadcast is referred to as the common pilot channel (CPICH). The PN sequences generated are truncated to a length of 38,400 chips. The period of 38,400 chips is referred to as a radio frame. Each radio frame is divided into 15 equal sections referred to as slots.

It is possible to search for W-CDMA base stations in the manner described for IS-95 systems, described above. That is, the entire PN space can be searched offset by offset (38,400 of them) for each of the 512 primary codes. However, this is not practical due to the excessive amount of time such a search would require. Instead, the W-CDMA standard calls for base stations to transmit two additional synchronization channels, the primary and secondary synchronization channels, to assist the subscriber unit in searching efficiently.

For initial acquisition, the three-step W-CDMA search provides a great performance increase, in terms of reduced search time, over the impractical alternative of searching the entire PN space for each scrambling code.

Search time is an important metric in determining the quality of a CDMA system. Decreased search time implies that searches can be done more frequently. As such, a subscriber unit can locate and access the best available cell more often, resulting in better signal transmission and reception, often at reduced transmission power levels by both the base station and the subscriber unit. This, in turn, increases the capacity of the CDMA system, either in terms of support for an increased number of users, higher transmission rates, or both. Decreased search time is also advantageous when a subscriber unit is in idle mode. In idle mode, a subscriber unit is not actively transmitting or receiving voice or data, but is periodically monitoring the system. In idle mode, the subscriber unit can remain in a low power state when it is not monitoring. Reduced search time allows the subscriber unit to spend less time monitoring, and more time in the low power state, thus reducing power consumption and increasing standby time.

SUMMARY

In general, the invention facilitates searching for energy peaks in spread spectrum wireless communication systems with greater precision without increasing the search time or materially increasing the amount of search hardware. More particularly, various embodiments of the invention may involve reporting not only an energy peak and its associated offset, but also the energy levels corresponding to one or more offsets occurring immediately before and after the offset at which the energy peak occurs. Interpolation or extrapolation techniques may be used to predict the actual location of an energy peak from its apparent location and the energy levels observed at surrounding offsets.

According to various embodiments of the invention, channel search hardware can operate in either of two modes. In one mode, the channel search hardware reports the offset and signal energy level associated with a detected energy peak. In the other mode, the channel search hardware also reports shoulder energy levels to the left and right of the detected energy peak, i.e., the signal energy levels detected at offsets preceding and following the detected energy peak.

The invention may offer a number of advantages. For example, many spread spectrum wireless communication systems employ a demodulator that operates at a higher resolution than the channel search hardware. Consequently, conventional search techniques can determine the location of an energy peak with a degree of precision limited by the resolution of the channel search hardware, e.g., one-half of a PN chip. By reporting the energy levels corresponding to the offsets to the immediate left and right of the apparent peak location as detected by the channel search hardware, and performing interpolation or extrapolation based on those energy levels, the channel search techniques provided by the present invention can determine the true peak location with a greater degree of precision. As a result, the time involved in time tracking may be reduced. Time tracking involves incrementally adjusting the offsets associated with demodulation fingers until they best match the actual offset of the signal, limited by the resolution of the demodulator. In addition, the physical location of the wireless communication device may be more accurately determined. Furthermore, because the energy levels adjacent to the peak are already generally available during the search operation, and the interpolation algorithms can be implemented in software, this invention can be implemented with only minimal modifications to the search hardware.

In one embodiment, the invention is directed to a channel search method implemented in a spread spectrum system. A peak energy level and at least one shoulder energy level are identified for a spread spectrum signal using channel search hardware. The peak energy level is received from the channel search hardware. In one mode of operation, at least one shoulder energy level is also received from the channel search hardware. A demodulator is configured as a function of the peak energy level and at least one shoulder energy level.

Another embodiment is directed to a method for identifying a spreading code used to encode a received CDMA signal. A search window that comprises a set of offsets within a pseudorandom noise (PN) sequence is defined. For each offset, a corresponding spreading code is applied to the received CDMA signal to obtain a signal energy level. At least one peak offset for which the obtained signal energy level is greatest is reported. When a shoulder mode is enabled, shoulder energy levels corresponding to offsets preceding and following the peak offset are also reported.

Other embodiments are directed to processor-readable media and apparatuses embodying these methods.

Additional details of various embodiments are set forth in the accompanying drawings and the description below. Other features, objects and advantages will become apparent from the description and drawings, and from the claims.

DETAILED DESCRIPTION

Figure 1:
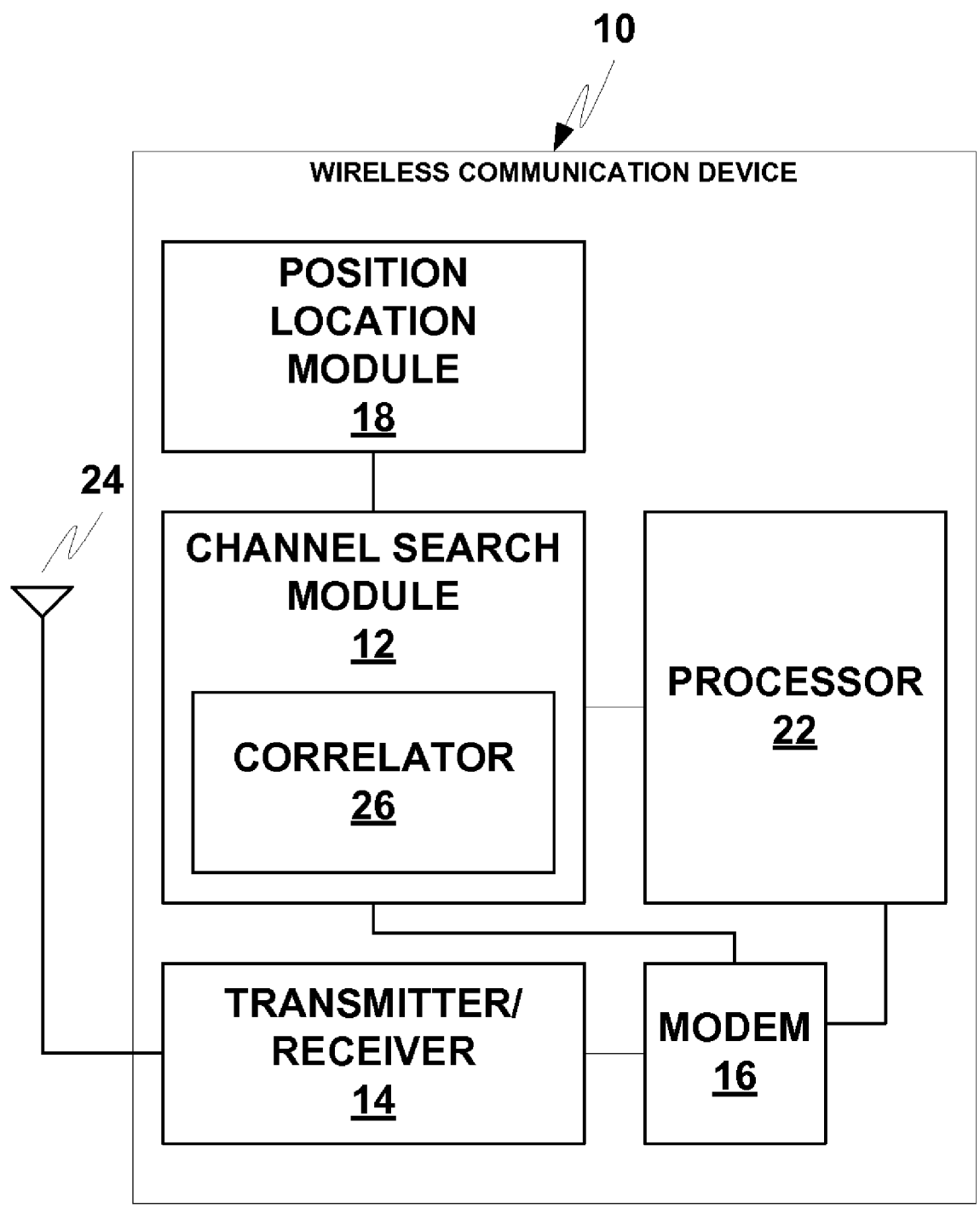
FIG. 1 is a block diagram illustrating a wireless communication device (WCD) that incorporates a channel search module, according to one implementation of the invention.

FIG. 1 is a block diagram illustrating an example wireless communication device (WCD) 10 having a channel search module 12 that can operate in a number or energy reporting modes. Depending on the operating mode, channel search module 12 may report, for example, not only an energy peak and its associated offset, but also the energy levels corresponding to one or more offsets proximate the offset at which the energy peak occurs.

As shown in FIG. 1, WCD 10 may include, in addition to channel search module 12, a radio frequency transmitter/receiver 14, a modem 16, a position location module 18, a microprocessor 22, and a radio frequency antenna 24. Non-limiting examples of WCD 10 include a cellular radiotelephone, satellite radiotelephone, a PCMCIA card incorporated within a computer, a PDA equipped with wireless communication capabilities, and the like. Furthermore, the techniques described in reference to FIG. 1 may readily by implemented within other components of a wireless system, such as a base station operating in a receive mode.

WCD 10 may be designed to support one or more CDMA standards and/or designs (e.g., the W-CDMA standard, the IS-95 standard, the cdma2000 standard, and the cdma2000 1xEV specification). Modem 16 includes demodulator/decoder circuitry and encoder/modulator circuitry, both of which are coupled to transmitter/receiver 14 to transmit and receive the communication signals.

In an embodiment of the invention, WCD 10 uses a CDMA protocol to transmit and receive signals with a base station via antenna 24. Before communicating signals with the base station, WCD 10 must align its PN sequences to those of the base station. For example, in IS-95, each base station and subscriber unit uses the exact same PN sequences. Base stations are distinguished by unique time offsets in the generation of their PN sequences. WCD 10 communicates with a base station by assigning at least one finger to that base station. An assigned finger must insert the appropriate offset into its PN sequence in order to communicate with that base station. An IS-95 receiver uses channel search module 12 to locate the offsets of pilot signals, and hence to use those offsets in assigning fingers for receiving signals from the base station. Since IS-95 systems use a single set of in-phase (I)

and quadrature (Q) PN sequences, one method of pilot location is to simply search the entire PN space by using a correlator module 26 or, alternatively, modem 16, to correlate an internally generated PN sequence with different offset hypotheses until one or more pilot signals are located.

As correlator module 26 correlates the PN sequence with each offset hypothesis, channel search module 12 records the resulting signal energy. Energy peaks appear for the offset hypotheses that result in recovery of the signal, while other offset hypotheses typically result in little or no signal energy. The signal energy level may be expressed as a relative value, e.g. a scaled integer having a value between 0 and 65535. As described below, channel search module 12 maps the offsets to corresponding signal energy levels, and identifies one or more signal peaks having the greatest energy levels. While only one offset is used in the generation of a PN sequence for a particular base station, signal reflections or echoes may cause multiple energy peaks to occur. WCD 10 may use these echoes to facilitate recovery of the transmitted signal.

Because the reflected signals may be useful, in some embodiments, WCD 10 identifies multiple signal peaks that correspond to both the transmitted and reflected signals. Channel search module 12 may operate in either of two modes. In one mode, channel search module 12 reports the offset and signal energy level for each detected signal peak. In the other mode, known as a shoulder mode, channel search module 12 also reports shoulder energy levels for each peak. That is, channel search module 12 reports the signal energy levels detected on either side of each peak, e.g. a left shoulder energy level and a right shoulder energy level. In this manner, channel search module can apply interpolation or extrapolation techniques to estimate the location of an energy peak with greater precision.

The operation of channel search module 12 is controlled by channel search software executed, for example, by microprocessor 22. As described below in connection with FIG. 4, the channel search software defines a search window by specifying the offset at which channel search module 12 begins the search, as well as either an offset at which channel search module 12 ends the search or the size of the search window, i.e., the number of offsets to search. Channel search module 12 then applies the offsets in the search window to the CDMA signal as described above and reports the results to the channel search software. The channel search software then uses this information to configure modem 16 by, for example, assigning demodulation fingers corresponding to the located spreading codes. The channel search software may also use the search results for other purposes, such as determining the physical location of WCD 10. Both assignment of demodulation fingers and position determination are improved by more accurate offset determination. For example, an accurate offset determination reduces the time needed for time-tracking. In addition, the location of WCD 10 can be determined more accurately. In W-CDMA devices, the offset determination may be used in an observed time difference of arrival (OTDOA) calculation to determine the position of WCD 10.

Figure 2:
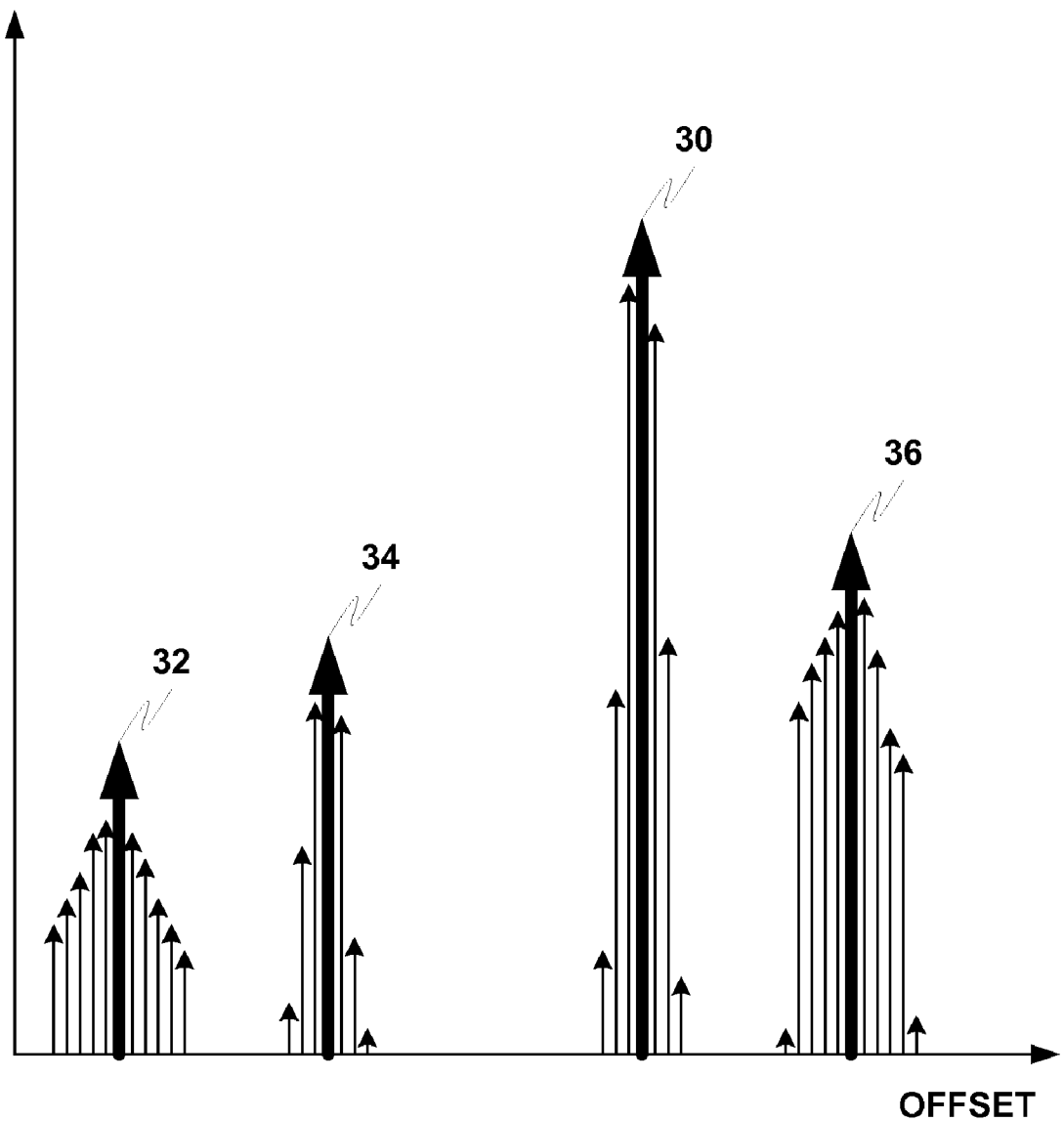
FIG. 2 is a graph illustrating an example mapping of PN offsets to signal energy levels.

FIG. 2 is a graph illustrating one example mapping identified by channel search module 12. In particular, FIG. 2 graphs energy levels produced by correlating the incoming CDMA signal with various spreading codes, i.e., with various offsets within the within the pseudorandom noise (PN) sequence. In this example, applying most of the spreading codes to the incoming CDMA signal results in no correlation and, consequently, no signal energy. Some spreading codes, however, result in energy peaks. For example, one energy peak 30 may correspond to the transmitted signal. Other energy peaks 32, 34, and 36 may represent reflected signals. In addition, each of the energy peaks 30, 32, 34, and 36 in this example has surrounding "shoulder" energy levels immediately to the left and right of the peak. These shoulder energy levels result from applying to the CDMA signal spreading codes corresponding to offsets immediately preceding and immediately following the offsets at which channel search module 12 located the energy peaks. In some cases, such as energy peaks 30 and 34, the peaks are relatively sharp, and the shoulder energy levels decrease rapidly on both sides of the peaks. In other cases, such as energy peaks 32 and 36, the shoulder energy levels decrease more gradually, indicating wider peaks.

As noted above, channel search module 12 may operate on a half-chip resolution. Alternatively, the signal energy levels could be measured with a higher resolution, e.g. an eighth-chip resolution, to match the resolution of the demodulator hardware. In some cases, one of the signal energy levels recorded at the higher resolution may be greater than the signal energy level at an energy peak detected at the half-chip resolution by channel search module 12. Consequently, the true location of an energy peak may be up to a half-chip away from its apparent location. Various embodiments of the invention can estimate the true location of an energy peak with greater precision, e.g., with eighth-chip resolution, by reporting, in one operational mode, not only the energy peak detected by channel search module 12 at half-chip resolution, but also the shoulder energy levels. These shoulder energy levels are a unit resolution away from the energy peak detected by channel search module 12. For example, if channel search module 12 operates at a half-chip resolution, the shoulder energy levels include the signal energy level at the offset one-half of a PN chip to the left of the energy peak and the signal energy level at the offset one-half of a PN chip to the right of the energy peak. In some embodiments, channel search module 12 uses an interpolation or extrapolation technique based on these shoulder energy levels to estimate the true location of the energy peak.

Accordingly, channel search module 12 can estimate the location of energy peaks with greater precision than is realized by the channel searching hardware alone. This greater degree of accuracy is advantageous in certain applications. For example, in some applications, recovery of the CDMA signal is significantly improved by precise offset determination. In addition, precise offset determination may facilitate accurate determination of the location of WCD 10.

Figure 3:
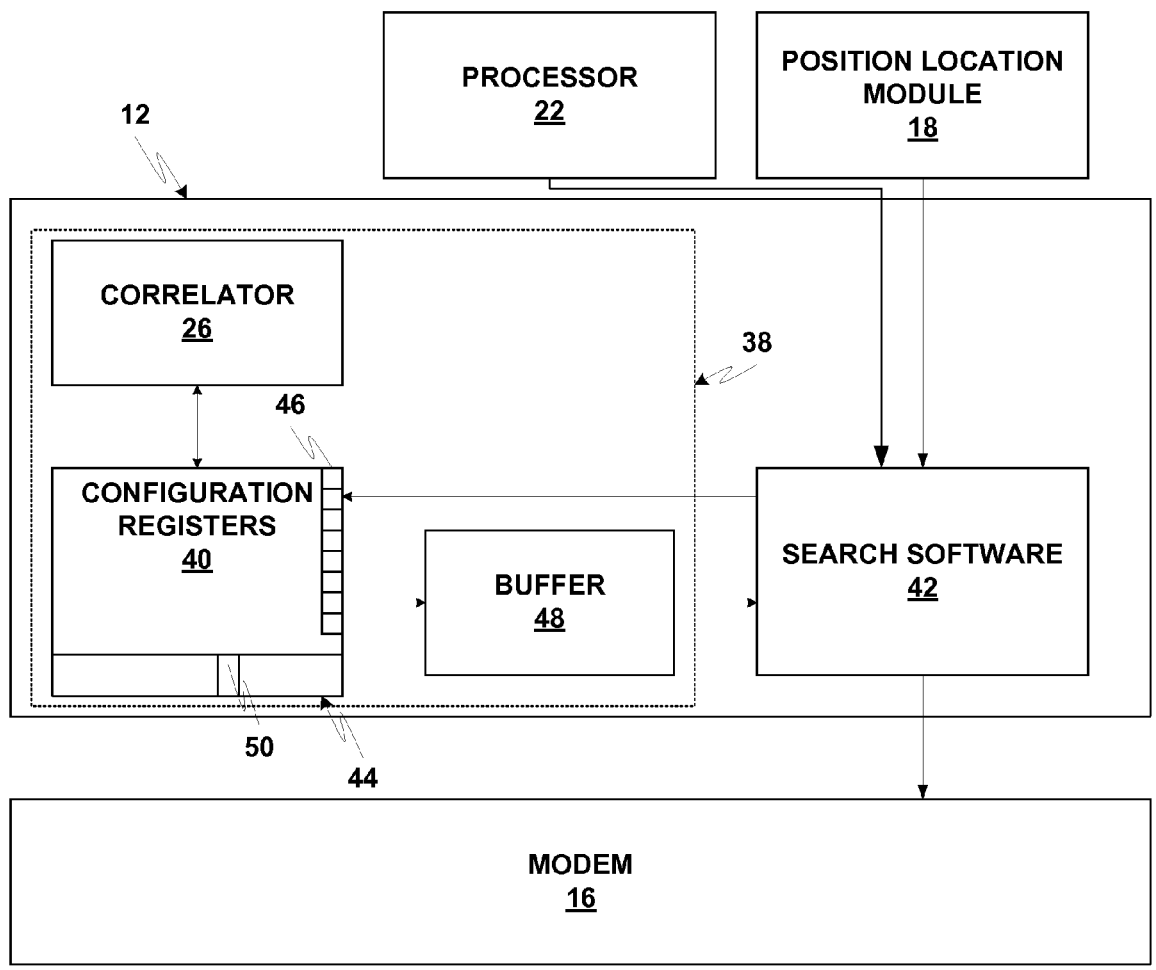
FIG. 3 is a block diagram depicting an implementation of a channel search module, according to another embodiment of the invention.

FIG. 3 is a block diagram depicting an example implementation of channel search module 12, according to an embodiment of the invention. Channel search module 12 includes search hardware 38 that identifies the offset associated with a base station by using correlator module 26 to apply the offset hypotheses associated with a prescribed range of offsets within the PN sequence. Search hardware 38 uses correlator module 26 to obtain signal energies at a range of offsets that are separated at a fixed resolution, e.g. at a resolution of one-half of a PN chip, independent of the resolution of demodulation or decoding hardware of modem 16.

Search software 42 executed, for example, by microprocessor 22 of FIG. 1, controls the search process using a search control register 44 to define search parameters. More particularly, search software 42 may specify the range of offsets to be tested by search hardware 38. In one embodiment, search software 42 may use a task queue 46 incorporated in configuration registers 40 to issue several search tasks to search hardware 38. As search hardware 38 completes each search task, it stores the search results, e.g., the peak or peaks having the most signal energy, in a buffer 48. Storing the search results in a buffer 48 allows search software 42 to read the search results from buffer 48 rather than from configuration registers 40, thereby freeing configuration registers 40 for other tasks, such as servicing other search requests. When buffer 48 is fully populated, search hardware 38 issues an interrupt to search software 42, prompting search software 42 to retrieve the search results.

In some embodiments, search software 42 may use a shoulder mode bit 50 in search control register 44 to specify whether configuration registers 40 should report search results in a normal mode or in a shoulder mode. In the normal mode, configuration registers 40 report, for each energy peak, the location (offset) of the peak and the energy associated with the peak. In the shoulder mode, configuration registers 40 report this information, as well as the energy levels associated with offsets to the left and to the right of the apparent location of the energy peak. These shoulder offsets may be separated from the apparent energy peak location by a unit resolution of search hardware 38. For example, if search hardware 38 operates on a resolution of one-half of a PN chip, the shoulder offsets may occur one-half of a PN chip to the left of the apparent peak location and one-half of a PN chip to the right of the apparent peak location. Alternatively, the shoulder offsets may be separated from the apparent energy peak location by a multiple of the unit resolution of search hardware 38, e.g. one PN chip.

Configuration registers 40 may report the search results in a format that is chosen based on the selected mode. For example, if the normal mode is selected, search software 42 may report the search results in a 32-bit format in which 16 bits are used to represent the offset at which search hardware 38 detected an energy peak and 16 bits are used to represent the energy level detected at that offset. Thus, the energy level may be represented as a scaled integer having a value between 0 and 65535 ($2^{16}$−1).

If, on the other hand, the shoulder mode is selected, configuration registers 40 may instead report the search results in a 64-bit format. In the 64-bit format, 32 bits are used to represent the location and level of a detected energy peak, as in the normal mode. In addition, 16 bits are used to represent the energy level detected at the offset immediately to the left of the apparent peak location, and 16 bits are used to represent the energy level at the offset immediately to the right of the apparent peak location. The offsets themselves may be inferred from the offset of the apparent peak location, and therefore do not need to be represented in the shoulder mode.

Because the shoulder mode uses twice as many bits to represent information relating to an energy peak, buffer 48 will populate with data twice as quickly in the shoulder mode as compared with the normal mode, assuming a fixed buffer size. Search software 42 therefore retrieves search results from buffer 48 twice as often in the shoulder mode. For cases in which it may be undesirable to retrieve search results this often, some embodiments of the invention advantageously allow search software 42 to selectably operate in either the shoulder mode or the normal mode.

In addition to reporting the energy levels associated with the apparent energy peak location and the offsets to the immediate left and right of the apparent energy peak location, search software 42 may also execute a conventional interpolation or extrapolation algorithm to estimate the true location of the energy peak based on its apparent location and the surrounding energy levels. As described above, due to delays associated with signal transmission, the true location of an energy peak may be as much as one-half a PN chip removed from its apparent location. Accordingly, interpolation may reveal the locations of energy peaks with a high degree of precision, e.g., within one-eighth of a PN chip. Because search software 42 carries out the interpolation or extrapolation process, the invention may be practiced with only minimal modification to search hardware 38.

The offset calculated as a result of the interpolation or extrapolation process may be used for a number of purposes. The calculated offset may, for example, be used to configure modem 16 by assigning demodulation fingers for demodulating the CDMA signal. In addition, position location module 18 may use the calculated offset to determine the physical location of the wireless communication device with greater accuracy.

While not common, some energy peaks may be relatively wide, such that significant energy levels occur over a wide range of offsets. In such cases, interpolation or extrapolation may yield more accurate results when additional energy levels are known. Accordingly, in some embodiments of the invention, configuration registers 40 may report additional energy levels, i.e., energy levels farther away from the apparent location of the energy peak, with a corresponding increase in the number of bits used to report information for a particular peak. For example, configuration registers 40 might use 96 bits to report energy levels for offsets up to two units away from the apparent location of an energy peak: 32 bits for the location and level of the energy peak and 16 bits for the energy levels at each of two offsets in both directions from the apparent location. Conversely, in some cases, only one shoulder energy level may be needed for interpolation or extrapolation. In some embodiments, configuration registers 40 may report only one shoulder energy, i.e., either the left shoulder energy level or the right shoulder energy level.

Figure 4:
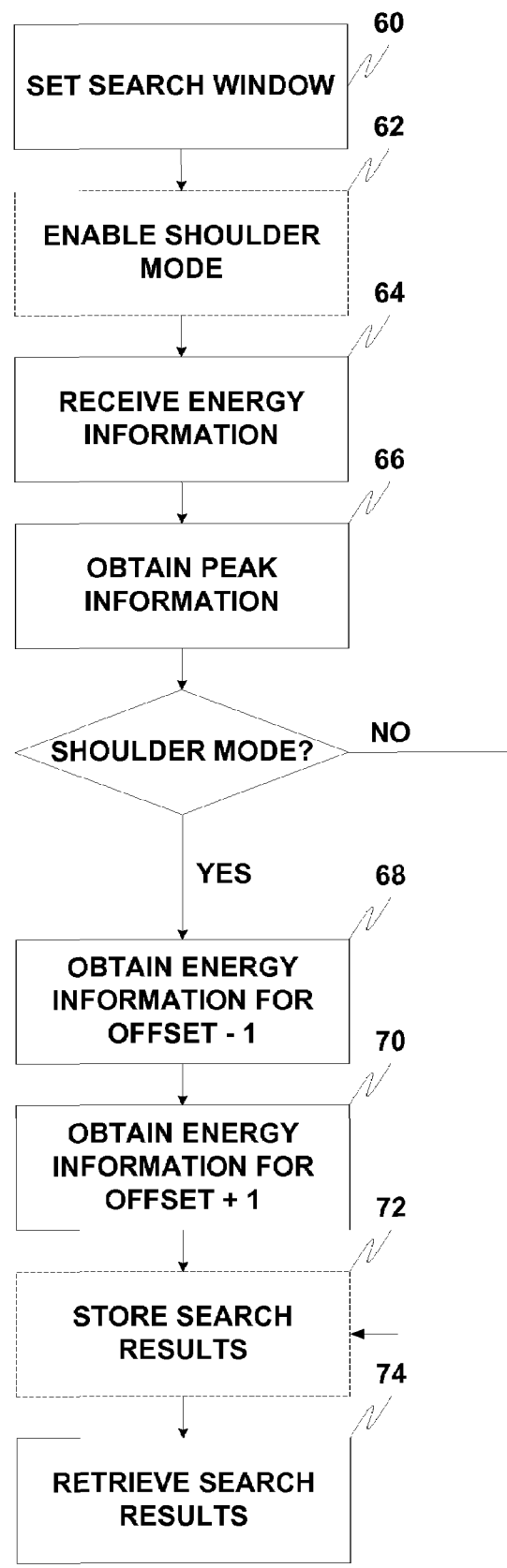
FIG. 4 is a flow diagram illustrating an example mode of operation of the channel search module shown in FIG. 3.

FIG. 4 is a flow diagram illustrating an example mode of operation of channel search module 12. To search for a spread spectrum channel, search software 42 first defines the parameters of the search by specifying the search window (60) using, for example, control register 44. Setting the search window involves specifying the offset at which the search is to commence and specifying either the offset at which the search is to terminate or the size of the window, i.e., the number of offsets to be searched. If the offset is represented as a 16-bit word, the starting and ending offsets may each have a value between 0 and 65535 ($2^{16}$−1).

The size of the window may be selected to fit the needs of the search. For example, when establishing a call, search software 42 is not likely to have prior knowledge of the spreading code used to encode a received CDMA signal. Accordingly, a large search window may be appropriate for an initial channel search. During a call, however, search software 42 is aware of the most recently used spreading code, and may limit subsequent searches to a small window around the offset corresponding to that spreading code.

As indicated by the dashed lines, search software 42 optionally enables the shoulder mode (62) as described above in connection with FIG. 3. Search software 42 then directs search hardware 38 to perform the channel search. Search hardware 38 receives from correlator module 26 the energy information associated with each offset hypothesis in the search window (64). Specifically, as correlator module 26 correlates the PN sequence with each offset hypothesis, search hardware 38 records the resulting signal energy. Energy peaks appear for the offset hypotheses that result in recovery of the signal, while other offset hypotheses typically result in little or no signal energy. As described above, the energy level may be represented as a 16-bit integer having a value between 0 and 65535, where 65535 corresponds to the greatest amount of signal energy and 0 corresponds to no signal energy.

Search hardware 38 analyzes the signal energy levels obtained and identifies one or more offset hypotheses producing the highest signal energy levels (66). In some embodiments, search hardware 38 may locate four peaks, but more or fewer peaks may be located. If the shoulder mode is enabled, search hardware 38 also obtains the signal energy levels for an offset to the left of the apparent peak location (68) and for an offset to the right of the apparent peak location (70). These offsets are typically one unit resolution less than the offset corresponding to the apparent peak location and one unit resolution greater than the offset corresponding to the apparent peak location. For example, if search hardware 38 operates at a resolution of one-half of a PN chip, search hardware 38 obtains signal energy levels for the apparent peak location, for the offset one-half of a PN chip to the left of the apparent peak location, and for the offset one-half of a PN chip to the right of the apparent peak location.

As described above, the search results may be represented as a 32-bit word if the shoulder mode is disabled, or as a 64-bit word if the shoulder mode is enabled. In either case, 16 bits are used to represent the offset at which search hardware 38 detected a peak, and 16 bits are used to represent the signal energy level detected at that offset. For example, if the signal energy level detected at offset 32768 is 20480, the search results may be represented as the 32-bit word 0100 0000 0000 0000 0010 0100 0000 0000.

If the shoulder mode is enabled, 16 bits are used to represent the signal energy level detected at the offset to the left of the apparent peak location, and 16 bits are used to represent the signal energy level detected to the right of the apparent peak location. For example, if the energy levels for the offsets to the left and right of offset 32768 are respectively 16000 (0011 1110 0100 0000 in binary) and 18000 (0100 0110 0101 0000), the search results may be represented as the 64-bit word 0100 0000 0000 0000 0010 0100 0000 0000 0011 1110 0100 0000 0100 0110 0101 0000.

In either case, search hardware 38 optionally stores the search results (72) in buffer 48. When buffer 48 is fully populated with search results, search hardware 38 issues an interrupt to search software 42. In response to the interrupt, search software 42 retrieves the search results (74) from buffer 48. Alternatively, search software 42 may retrieve the search results directly from configuration registers 40. However, retrieving the search results from buffer 48 allows configuration registers 40 to perform other tasks, such as additional searches, and is therefore generally preferable.

Instructions for processor 22 for executing channel search software 42, may be stored on processor readable media. By way of example, and not limitation, processor readable media may comprise storage media. Storage media includes volatile and nonvolatile, removable and fixed media implemented in any method or technology for storage of information such as processor-readable instructions, data structures, program modules, or other data. Storage media may include, but is not limited to, random access memory (RAM), read-only memory (ROM), EEPROM, flash memory, fixed or removable disc media, including optical or magnetic media, that can be used to store the desired information and that can be accessed by a processor within WCD 10.

The term "modulated data signal" means a signal that has one or more of its characteristics set or changed in such a manner as to encode information in the signal. Computer readable media may also include combinations of any of the media described above.

By interpolating shoulder energy levels as described above, the invention facilitates searching for energy peaks in CDMA-based wireless communication systems with greater precision. For example, in systems in which the demodulator operates on a resolution of one-eighth of a PN chip and the search hardware operates on a resolution of one-half of a PN chip, interpolation techniques may be used to predict the actual location to within one-eighth of a PN chip, as compared to the one-half PN chip resolution realized by some conventional channel searching techniques.

Several embodiments of the invention have been described in the context of continuous pilot signals. However, the invention can also be implemented for searching for other types of pilot signals, including beam-formed pilot signals and discontinuous pilot signals, both of which may be employed in W-CDMA systems. In W-CDMA systems, there are two types of common pilot channels: primary and secondary. The primary common pilot channel (CPICH) is always under the primary scrambling code with a fixed channelization code allocation, and there is only one such channel for a sector or cell. By contrast, the secondary CPICH may have any channelization code of length 256 and may be under a secondary scrambling code as well. The secondary CPICH would be used with narrow antenna beams intended for service provision at specific "hot spots" or places with high traffic density.

W-CDMA systems also use discontinuous pilot signals that do not consist entirely of pilot symbols. For example, the dedicated physical channel (DPCH) contains time-multiplexed fields designated for data bits, power control bits, transport format combination bits, and pilot bits. The pilot bits are transmitted on a dedicated channel and hence are referred to as dedicated pilot symbols. The primary purpose of dedicated pilot symbols is to aid channel estimation. For example, by correlating the known sequence of dedicated pilot symbols with the received symbols, it is possible to refine the timing and energy knowledge of the DPCH.

While various embodiments of the invention have been described, modifications may be made without departing from the spirit and scope of the invention. For example, while some embodiments have been described as reporting a peak energy level and two shoulder energy levels, more or fewer shoulder energy levels may be reported. These and other embodiments are within the scope of the following claims.

The invention claimed is:

1. A computer readable medium encoded with computer executable instructions for:
    identifying a peak energy level and at least one shoulder energy level with a first time resolution for a spread spectrum signal;
    receiving the peak energy level and, when a mode of operation is enabled, the at least one shoulder energy level;
    configuring a demodulator as a function of the peak energy level and the at least one shoulder energy level when the mode of operation is enabled, and
    configuring the demodulator without the at least one shoulder energy level when the mode of operation is disabled, wherein the demodulator operates at a second time resolution that is more fine than the first time resolution.

2. The computer readable medium of claim 1, further encoded with computer executable instructions for
    calculating an offset of an energy peak based on the peak energy level, an offset corresponding to the peak energy level, and the at least one shoulder energy level.

3. The computer readable medium of claim 2, further encoded with computer executable instructions for
    calculating the offset of the energy peak using at least one of an interpolation technique and an extrapolation technique.

4. The computer readable medium of claim 1, further encoded with computer executable instructions for:
    defining a search window comprising a set of offsets for a pseudorandom noise (PN) sequence; and
    for each offset in the search window, applying a corresponding spreading code to the spread spectrum signal.

5. The computer readable medium of claim 1, further encoded with computer executable instructions for
    identifying a plurality of additional peak energy levels for the spread spectrum signal and respective shoulder energy levels for at least one of the additional peak energy levels.

6. The computer readable medium of claim 1, wherein the spread spectrum signal comprises one of a continuous pilot signal, a discontinuous pilot signal, and a beam-formed pilot signal.

7. A computer readable medium encoded with computer executable instructions for:
defining a search window comprising a set of offsets for a pseudorandom noise (PN) sequence, wherein the set of offsets is at a first time resolution that is more coarse than a second time resolution of a demodulator used to demodulate a received CDMA signal;
for each offset, applying a corresponding spreading code to the received CDMA signal to obtain a signal energy level;
identifying a peak offset for which the obtained signal energy level is greatest, wherein the peak offset has the first time resolution;
deciding whether to enable a shoulder mode;
when the shoulder mode is enabled, reporting a first shoulder energy level corresponding to an offset preceding the peak offset and a second shoulder energy level corresponding to an offset following the peak offset; and
when the shoulder mode is not enabled, refraining from reporting the first shoulder energy level.

8. The computer readable medium of claim 7, further encoded with computer executable instructions for
calculating an offset of an energy peak using at least one of an interpolation technique and an extrapolation technique as a function of the signal energy level corresponding to the peak offset, an offset corresponding to the peak energy level, and the first and second shoulder energy levels, wherein the offset of the energy peak has the second time resolution.

9. The computer readable medium of claim 8, further encoded with computer executable instructions for
demodulating the received CDMA signal using a spreading code corresponding to the calculated offset.

10. The computer readable medium of claim 8, further encoded with computer executable instructions for
determining a position as a function of the calculated offset.

11. The computer readable medium of claim 7, further encoded with computer executable instructions for
identifying at least one additional shoulder energy level.

12. The computer readable medium of claim 7, wherein the received CDMA signal comprises one of a continuous pilot signal, a discontinuous pilot signal, and a beam-formed pilot signal.

13. An apparatus comprising:
means for identifying a peak energy level and at least one shoulder energy level with a first time resolution for a spread spectrum signal;
means for receiving the peak energy level and, when a mode of operation is enabled, the at least one shoulder energy level;
means for configuring a demodulator as a function of the peak energy level and the at least one shoulder energy level when the mode of operation is enabled, and
means for configuring the demodulator without the at least one shoulder energy level when the mode of operation is disabled, wherein the demodulator operates at a second time resolution that is more fine than the first time resolution 14. The apparatus of claim 13, further comprising
means for calculating an offset of an energy peak based on the peak energy level, an offset corresponding to the peak energy level, and the at least one shoulder energy level.

15. The apparatus of claim 14, further comprising
means for calculating the offset of the energy peak using at least one of an interpolation technique and an extrapolation technique.

16. The apparatus of claim 13, further comprising:
means for defining a search window comprising a set of offsets for a pseudorandom noise (PN) sequence; and
means for applying a corresponding spreading code to the spread spectrum signal for each offset in the search window.

17. The apparatus of claim 13, further comprising
means for identifying a plurality of additional peak energy levels for the spread spectrum signal and respective shoulder energy levels for at least one of the additional peak energy levels.

18. The apparatus of claim 13, wherein the spread spectrum signal comprises one of a continuous pilot signal, a discontinuous pilot signal, and a beam-formed pilot signal.

19. An apparatus comprising:
means for defining a search window comprising a set of offsets for a pseudorandom noise (PN) sequence, wherein the set of offsets is at a first time resolution that is more coarse than a second time resolution of a demodulator used to demodulate a received CDMA signal;
means for applying a corresponding spreading code to the received CDMA signal to obtain a signal energy level for each offset;
means for identifying a peak offset for which the obtained signal energy level is greatest, wherein the peak offset has the first time resolution;
means for deciding whether to enable a shoulder mode;
means for reporting a first shoulder energy level corresponding to an offset preceding the peak offset and a second shoulder energy level corresponding to an offset following the peak offset when the shoulder mode is enabled; and
means for refraining from reporting the first shoulder energy level when the shoulder mode is not enabled.

20. The apparatus of claim 19, further comprising
means for calculating an offset of an energy peak using at least one of an interpolation technique and an extrapolation technique as a function of the signal energy level corresponding to the peak offset, an offset corresponding to the peak energy level, and the first and second shoulder energy levels, wherein the offset of the energy peak has the second time resolution.

21. The apparatus of claim 20, further comprising means for demodulating the received CDMA signal using a spreading code corresponding to the calculated offset.

22. The apparatus of claim 20, further comprising
means for determining a position as a function of the calculated offset.

23. The apparatus of claim 19, further comprising
means for identifying at least one additional shoulder energy level.

24. The apparatus of claim 19, wherein the received CDMA signal comprises one of a continuous pilot signal, a discontinuous pilot signal, and a beam-formed pilot signal.

* * * * *